US010219052B2

(12) United States Patent
Zhu et al.

(10) Patent No.: US 10,219,052 B2
(45) Date of Patent: *Feb. 26, 2019

(54) AGILE RESOURCE ON DEMAND SERVICE PROVISIONING IN SOFTWARE DEFINED OPTICAL NETWORKS

(71) Applicants: The Arizona Board of Regents on Behalf of the University of Arizona, Tucson, AZ (US); Futurewei Technologies, Inc., Plano, TX (US)

(72) Inventors: Jiafeng Zhu, Pleasanton, CA (US); Jun He, Los Angeles, CA (US); Likun Lin, Tucson, AZ (US); Weiyang Mo, Tucson, AZ (US); Saied Agahi, Tuscon, AZ (US); John Wissinger, Tucson, AZ (US)

(73) Assignees: FUTUREWEI TECHNOLOGIES, INC., Plano, TX (US); THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,914

(22) Filed: Aug. 31, 2017

(65) Prior Publication Data
US 2017/0366883 A1 Dec. 21, 2017

Related U.S. Application Data

(63) Continuation of application No. 14/873,555, filed on Oct. 2, 2015, now Pat. No. 9,774,931.

(51) Int. Cl.
*H04Q 11/00* (2006.01)
*H04J 14/02* (2006.01)
(Continued)

(52) U.S. Cl.
CPC ..... *H04Q 11/0066* (2013.01); *H04B 10/0793* (2013.01); *H04J 14/0212* (2013.01);
(Continued)

(58) Field of Classification Search
CPC ....... H04Q 11/0066; H04Q 2011/0083; H04Q 2011/0016; H04Q 2011/0086;
(Continued)

(56) References Cited

U.S. PATENT DOCUMENTS

| 2008/0298805 | A1 | 12/2008 | Lee et al. |
| 2011/0158641 | A1 | 6/2011 | Barnard et al. |
| 2013/0250770 | A1* | 9/2013 | Zou .......................... H04L 47/19 370/238 |
| 2013/0315580 | A1 | 11/2013 | Boertjes et al. |

(Continued)

FOREIGN PATENT DOCUMENTS

WO 2013139298 A1 9/2013

*Primary Examiner* — Juan A Torres
(74) *Attorney, Agent, or Firm* — Slater Matsil, LLP

(57) ABSTRACT

An embodiment method for managing connections on a communications network having an optical network portion includes receiving a request for a first connection at a controller in signal communication with one or more reconfigurable optical add-drop multiplexers (ROADMs) controlling an optical network portion of a communications network, wherein the controller is connected to the communications network. The controller determines a route on the communications network for the first connection according to conditions of the communications network, with the route comprising one or more first links of the optical network. The controller determines one or more first ROADMs controlling the one or more first links and sends commands from the controller to the one or more first ROADMs to allocate bandwidth on the one or more first links.

16 Claims, 6 Drawing Sheets

(51) Int. Cl.
*H04B 10/079* (2013.01)
*H04L 12/721* (2013.01)

(52) U.S. Cl.
CPC ...... *H04J 14/0257* (2013.01); *H04J 14/0267* (2013.01); *H04J 14/0271* (2013.01); *H04J 14/021* (2013.01); *H04L 45/62* (2013.01); *H04Q 2011/0016* (2013.01); *H04Q 2011/0073* (2013.01); *H04Q 2011/0083* (2013.01); *H04Q 2011/0086* (2013.01)

(58) Field of Classification Search
CPC .......... H04Q 2011/0073; H04J 14/0212; H04J 14/0267; H04B 10/0793
USPC .......................................................... 398/25
See application file for complete search history.

(56) References Cited

U.S. PATENT DOCUMENTS

| | | |
|---|---|---|
| 2013/0336658 A1 | 12/2013 | Xia et al. |
| 2014/0095685 A1 | 4/2014 | Cvijetic et al. |
| 2014/0098710 A1 | 4/2014 | Ong |
| 2015/0063802 A1 | 3/2015 | Bahadur et al. |
| 2015/0127805 A1* | 5/2015 | Htay .................. H04L 43/0876 709/224 |
| 2015/0334002 A1* | 11/2015 | Jogalekar ............... H04L 47/12 370/238 |
| 2016/0105380 A1* | 4/2016 | Chhillar ................. H04L 45/28 370/244 |
| 2016/0182329 A1* | 6/2016 | Armolavicius ......... H04L 45/02 370/230 |

* cited by examiner

AGILE RESOURCE ON DEMAND SERVICE PROVISIONING IN SOFTWARE DEFINED OPTICAL NETWORKS

CROSS-REFERENCE TO RELATED APPLICATIONS

This application is a continuation of U.S. application Ser. No. 14/873,555, filed on Oct. 2, 2015, which application is hereby incorporated herein by reference.

TECHNICAL FIELD

The present invention relates generally to systems and methods for automatically controlling routing and provisioning on software defined optical networks, and, in particular embodiments, to systems and methods for creating dedicated light paths in optical networks in response to a connection request.

BACKGROUND

Generally, internet communications are provided by connections that are a combination of wireline and optical networks. The wireline networks may include physical conductor connections, such as Ethernet, or other physical connections, wirelines connections such as cellular connections, wireless backhaul, microwave or the like, or a combination of physical and wireless links. Optical networks are known for their ability to provide high bandwidth while introducing very little signal noise into communications transiting the optical network. Optical networks are frequently combined with wireline networks, with the optical networks and wireline networks combining to provide an end-to-end communications connection.

Optical networks have reconfigurable optical add-drop multiplexers (ROADMs) that act as endpoints for legs in the optical network. The ROADMs allocate channels each having a predetermined bandwidth, and transmit data for a connection on the allocated channels. The nature of the optical networking requires that the connections between ROADMs be configured at the ROADMs prior to data being transmitted over the optical connection since ROADMs do not act as routers by interpreting the destination or routing on the fly from data in the transmission.

SUMMARY

An embodiment method includes receiving a request for a first connection at a controller in signal communication with one or more first reconfigurable optical add-drop multiplexers (ROADMs) controlling an optical network portion of a communications network, wherein the controller is connected to the communications network. The controller determines a route on the communications network for the first connection according to conditions of the communications network, with the route including one or more first links of the optical network. The controller determines one or more first ROADMs controlling the one or more first links and sends commands from the controller to the one or more first ROADMs to allocate bandwidth on the one or more first links.

Another embodiment method includes monitoring, by a controller, network conditions on a communications network having an optical network portion controlled by reconfigurable optical add-drop multiplexers (ROADMs) in signal communication with the controller. A request for a first connection is received and a route for the first connection is determined according to network conditions, with the route including one or more links of the optical network. First commands are then transmitted from the controller to the ROADMs to set up the route.

An embodiment network flow controller, includes one or more communications interfaces, a processor connected to the one or more communications interfaces and a non-transitory computer readable medium connected to the processor and having stored thereon instructions. When executed, the instructions cause the processor to receive, through the one or more communications interfaces, at least one of network condition reports or network topology reports from reconfigurable optical add-drop multiplexers (ROADMs) in a communications network having an optical network portion. The instructions further cause the processor to receive a request for a first connection and determine a route for the first connection according to network conditions, with the route comprising one or more links of the optical network portion. The instructions further cause the processor to determine one or more first ROADMs controlling the one or more links and transmit first commands to the ROADMs to set up the route.

An embodiment network flow controller includes a processor connected to the one or more communications interfaces and a non-transitory computer readable medium connected to the processor and having stored thereon instructions. The instructions, when executed, cause the processor to receive a request for a first connection on a network having at least an optical network portion and a wireline network portion, and determine a route for the first connection according to network conditions, with the route comprising one or more first links of the optical network portion and one or more second links of the wireline network portion. The instructions further cause the processor to set up the first connection according to the route by sending first commands to one or more reconfigurable optical add-drop multiplexers (ROADMs) in the optical network portion and by sending second commands to one or more packet-level devices in the wireline network portion.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presented embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Additionally, the methods and systems described may be applied to communications systems with optical network elements, but are not specifically limited to the same.

Optical networks are frequently deployed as carriers in communications systems due to the optical networks' ability to provide high capacity, reliability and low noise signals. The optical networks are sometimes combined with wireline networks, with the wireline systems carrying electrical signals over conductive lines. Lights paths are created in the optical network by reconfigurable optical add-drop multiplexers (ROADMs) that allocate a portion of spectrum or bandwidth of the optical signal to channels for a particular communications signal. Thus, a signal may be transmitted over a wireline connection using an electrical signal such as a digital Ethernet signal or the like, to a ROADM or border element that converts the digital electrical signal to an optical signal, which is then transmitted over a leg of the optical network.

However, one of the drawbacks of optical networks is that the optical signals cannot be accessed during transit for routing of the signals. This is in contrast to electrical signals, which are read without disturbing the signal to access the addressing information of packets in the electrical signal. Accessing the addressing information permits dynamic routing of the signal during transmission. Thus, dedicated light paths must be created for each signal transiting the optical network since optical signals cannot be dynamically routed to take advantage of portions of the optical network bandwidth that are underutilized.

It has been discovered that on-demand service provisioning can be provided by tracking the network resources of optical networks and automatically creating light paths for specific signals using, for example, a controller. Thus, the optical network may be considered to be a software defined optical network (SDON) since the creation of the light paths is controlled automatically. Additionally, the light paths may be maintained until explicitly released, for example, after expiration of a predetermined time period, until a user, application or device releases the connection, or the like. In some embodiments, existing network equipment may be integrated into the presented systems by providing a command translator for mapping or translating commands from the controller into a previously defined set of commands or message format used by existing optical network equipment such as ROADMs.

Figure 1:
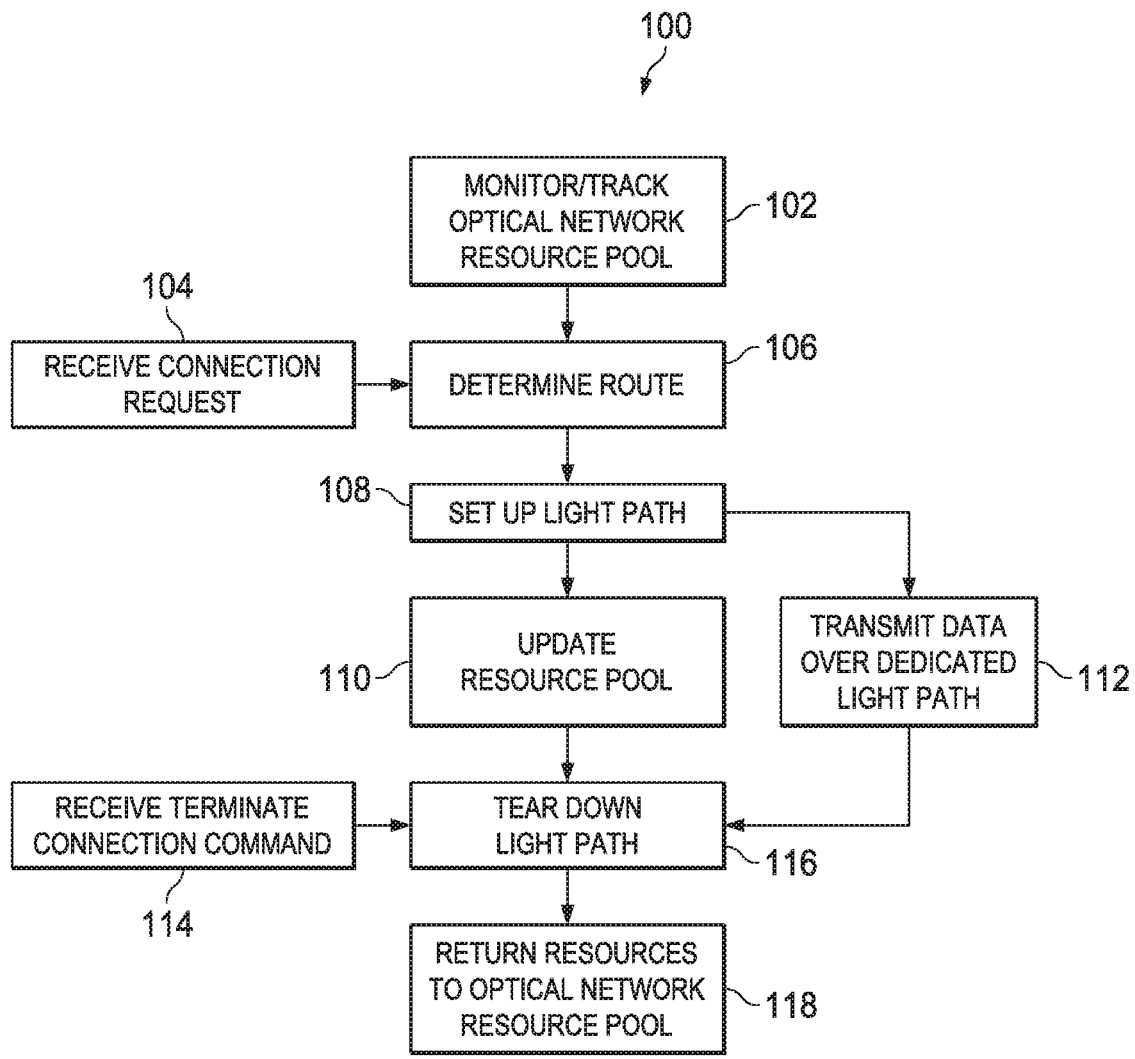
FIG. 1 is a flow diagram illustrating a method for setting up and managing a dedicated light path connection in an optical network according to some embodiments.

FIG. 1 shows a flow diagram illustrating a method 100 for setting up and managing a dedicated light path connection in an optical network according to some embodiments. Initially, a controller monitors or tracks an optical network resource pool in block 102. In some embodiments, the controller may be a software defined network (SDN) or software defined optical network (SDON) controller. The optical network resource pool may, in some embodiments, be data stored in a state table, state controller, database, table or tables, binary representation, or using other information organization technique for tracking at least existing light paths through the optical network and resources available for assignment to new light paths. For example, the network resource pool may track the bandwidth available on each leg within an optical network. The bandwidth may be identified as available channels or the bandwidth that is free or used on each leg. The optical network, in some embodiments, use wavelength division multiplexing (WDM) to permit multiple carrier signals at different frequencies to be multiplexed into a single optical signal and transmitted over a single fiber optic cable, greatly increasing the carrying capacity of individual cables. The network resource pool may also have a list of connections and the associated channels and legs that are provisioned to carry the respective connections, permitting optimization of multiple signals into shared channels to reduce the unused bandwidth in each channel. In some embodiments, the controller may also track additional information related to the topography of the optical network such as capacity, topography, or location and/or number of connections entering the optical network from wireline connections. Additionally, the controller may track information related to each of the connections, such as guaranteed bandwidth, guaranteed quality of service, required connection duration, connection termination conditions, or customer, user and account information, or the like.

The network resource pool may be generated initially by querying the ROADMs to determine the legs from each ROADMs and the capacity of each leg. Such information may be obtained, for example, by actively querying the ROADMs, loading a network configuration or topology from a storage location, receiving the network configuration or topology from another element, or the like. During network operation, the controller tracks the bandwidth or channels used to provide the light path for each connection and the network resource pool is updated to reflect optical capacity of each leg as light paths are created or released.

In block 104, a request for a connection is received. In some embodiments, the request for the connection is received by the controller, and in other embodiments, the request for the connection is received by another application and a command or request is sent to the controller upon verification, authentication or other authorization of the connection request by the other application. Thus, a third party may receive the connection request and handle billing and authentication outside of the controller.

In block 106, the controller determines a route for the connection. A route, including a light path route through the optical network, is determined based on the source and destination addresses and in some embodiments, based on the network resource pool. In some embodiments determination of the route may include routing for a wireline portion of the network. The light path route may be determined using the route entry points from the wireline systems into the optical network.

The determination of the route within the optical network is, in some embodiments, determined based on conditions of the network or portions of the network, such as the available resources and the optimal path through the optical network. For example, the route may be determined taking into account the required bandwidth of the connection, the available bandwidth or existing wavelength use in legs on the optical portion of the network, traffic conditions on different parts of the network, or the like. The calculation of the optimal path may include determining whether multiple signals, in one or more legs, may be combined to reduce the unused bandwidth in allocated channels. For example, where a channel has a bandwidth capacity with a standard channel-slot allocation, the bandwidth required for the assigned signal may be smaller than the bandwidth capacity of the channel. In such an embodiment, multiple signals may be multiplexed into a shared channel so that the assigned channel bandwidth more closely matches the total bandwidth required for the multiplexed signals. Such bandwidth allocation optimization may be performed for each leg of a light path during the route determination. In some embodiments, the allocation optimization may also be performed when a light path is released to optimize the bandwidth allocation of the remaining light paths.

The light path is set up in block 108 using the route that was determined for the connection request. In some embodiments the light path is set up by sending commands to ROADMs or other network elements in the optical network and to routers, switches, or the like in wireline portions of the network. The commands may be sent from the controller in a first format and then translated by, for example, a command translator, into a second format that can be understood by the ROADMs. The ROADMs may be customized ROADMs having command translators disposed on hardware of the ROADM itself. Other ROADMs may be standard ROADMs that receive translated commands from the controller through a standalone command translator or a command translator at the controller.

It should be understood that the determination of the route in block 106 and the setting up of the light path in block 108 may be performed any time after the connection request is received. For example, in a dynamic service embodiment, such as providing an on-demand premium service connection, the route may be determined and the light path set up the directly after the connection request is received in block 104 so that the premium connection with the light path is immediately available. In such an example, setting up the light path may include commands to the routers or network components in the wireline network portion to re-route the connection to a specific entry point for the optical network so that the wireline route connects with the light path route. In other embodiments, such as a system providing reserved, pre-scheduled or guaranteed service, the bandwidth for the connection may be reserved, or the connection otherwise scheduled, when the connection request is received, and the route determination and light path set up may be performed at a later time that is closer to the scheduled time the light path will be needed. For example, a guaranteed bandwidth connection for a video conference may be scheduled on a first day for a teleconference happening at a later day. The route determination and light path setup may be performed, for example, fifteen minutes before the scheduled start of the conference call to permit early arrivals to join the conference call using the route and light path. In other embodiments, the conference organizer may specify a time to open the conference call, and the route determination and light path setup may be performed at the specified time, permitting the service provider to accurately bill for the time reserved by the conference organizer without requiring the connection to be created prior to being needed.

In block 110, the resource pool may be updated after the light path is set up in block 108. In some embodiments, the resource pool may be updated in block no directly after the resource pool may be updated by adjusting the available bandwidth recorded for each leg, by recording used bandwidth or paths on each leg, or the like. In some embodiments, the resource pool may also be updated to reflect changes to network topography, leg capacity or the like, to reflect changes in the network, usage of network resources, anticipated load, changes to the wireline networks or wireline network connection points serving the optical network, traffic conditions in the wireline or optical networks, or the like.

After the light path is set up, the data for the connection is transmitted over the dedicated light path in block 112. In an embodiment, the controller may track the internet protocol address (IP address) of the connections that will be using the designated light path, or may track devices, accounts or users that are authorized to use the light path through the third party software that initiates or requests the connection, through an account associated with the light path, through data stored on the accessing device such as a cookie, authorization file, password, or the like. It should be understood that, while, the light path is described herein as a point-to-point path routed between single points, the light path may have one or more paths that are each configured for one or more devices.

The controller may receive a command, message or signal to terminate the connection in block 114. In some embodiments, the controller receives a terminate command from third party software, with the terminate command triggered by the connection being released by the users, for example, at the end of a video conference call, gaming session, media streaming session, or the like. In another example, the third party software may monitor the usage of the connection to determine if the connection remains idle for a predetermined period of time, indicating that the connection has been abandoned without being explicitly shut down. In yet another example, the connection may be terminated in response to the expiration of a timer, the exhaustion of user account credits, or the like. In other embodiments, the terminate command may be generated by the controller or received from a network device, or another device connected to the controller.

In block 116, the light path is torn down. The controller, in some embodiments, sends commands to the ROADMs, directly, or through a command translator, to release the respective light path. The controller may also perform a re-optimization on the remaining light paths to consolidate the light paths through multiplexing, re-routing, bandwidth reallocation, or the like. In such embodiments, the commands to re-optimize the light paths may be part of the command to release the terminated light path, or may be sent separately from the command to release the terminated light path.

The resources freed by tearing down the light path in block 116 are returned to the optical network resource pool in block 118. In some embodiments, the resource pool is updated to reflect the available bandwidth on each leg, and in embodiments where tearing down the light path re-optimizes the remaining light paths, the resource pool may be updated to reflect the re-optimized light paths or bandwidth availability changed by the re-optimization. In other embodiments, the re-optimization is performed during the updating of the resource pool since the controller is accessing the data storage, database, or other storage system used to hold the resource pool. In yet other embodiments, the tearing down of the light path is performed after re-optimization and updating of the resource pool as part of the commands to the ROADMs to modify the remaining light paths or routings to re-optimize traffic on the optical network.

Figure 2:
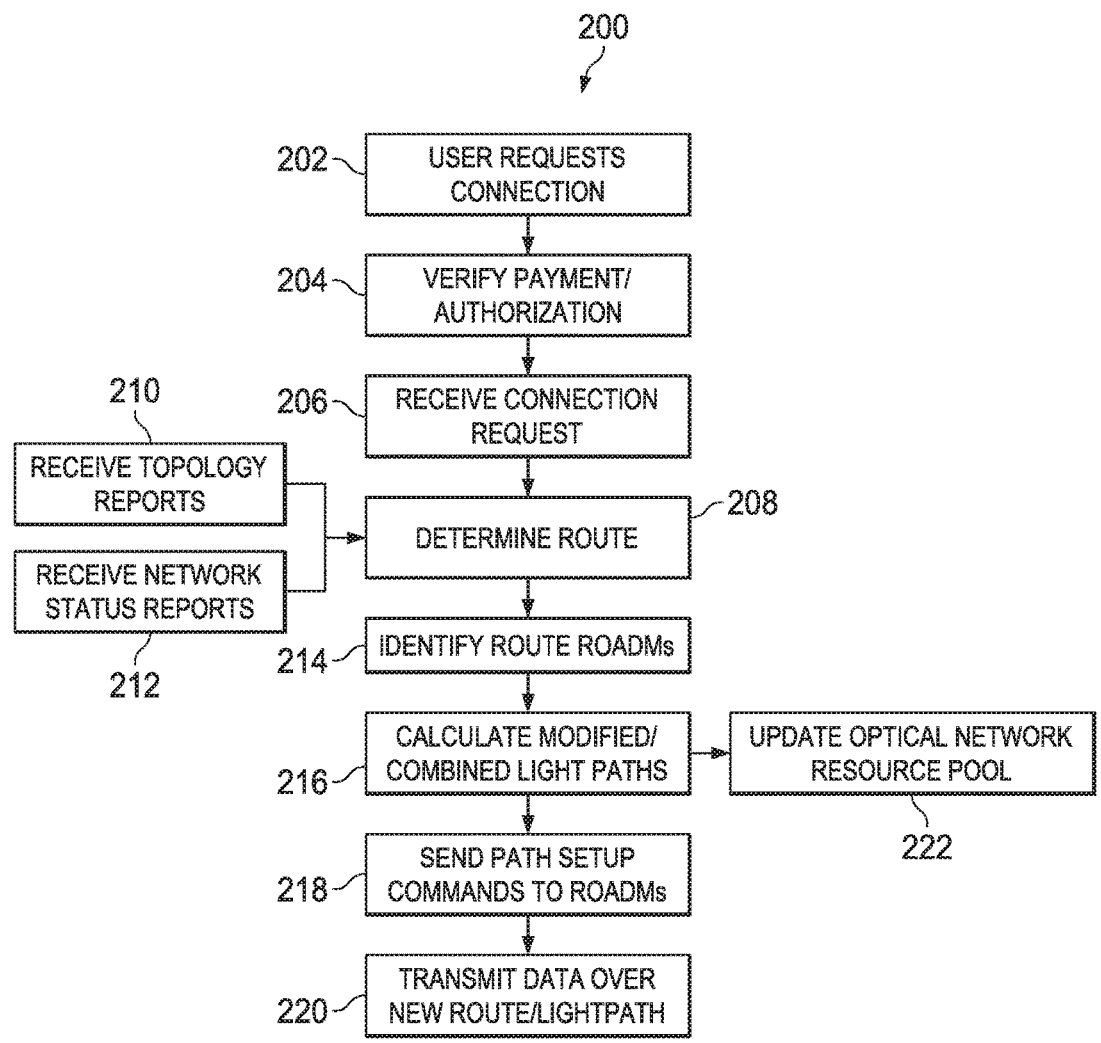
FIG. 2 is a flow diagram illustrating a method for setting up a dedicated light path connection in an optical network according to some embodiments.

FIG. 2 is a flow diagram illustrating a method 200 for setting up a dedicated light path connection in an optical network according to some embodiments. This method 200 may be combined, in part, with elements of FIG. 1, and illustrates various embodiments for initiating a dedicated light path for on demand path creation.

In some embodiments, a user requests a connection in block 202. In some embodiments, the request is made through a third party, as described above. The third party software may access the controller through an application programming interface (API), through another third party, or may mediate, or pass the request on to the controller or another element, module or piece of software that is associated with the controller. In other embodiments, the user may request the connection directly from the controller, or through another module, server or software element associated with or in communication with the controller. In yet other embodiments, an application may request a light path, and the request may be automatically generated when the controller determines that packets from the application or connection are sent.

The user's payment or authorization is verified in block 204. In embodiments wherein the user request is made through a third party provider's software, the third party may be responsible for verifying authorization or payment form the user. In such an example, the controller may log the request in an accounting subsystem and bill or apply any charges or debits for the connection to the third party provider.

The user connection request is received by the controller in block 206. In some embodiments, the user connection request is received by the controller from the third party software by way of an API, or the like. The third party software may receive the user connection request in any format, and may convert the connection request into a standardized format accepted by the controller.

For example, a trusted third party may have a contractual or billing arrangement with the operators of the optical network and controller. The trusted third party may provide, for example, premium bandwidth or connection services for telemedicine, videoconferencing, gaming, media streaming, interactive services, or other delay-sensitive information services. The third party may provide the services on-demand or as a scheduled service. For example, a video conference may be scheduled through a service provider, which schedules the connection for a subsequent time. The service provider may initiate the connection by way of a connection request at, or a predetermined time period before, the scheduled time. In another example, a gamer may request a premium connection during gameplay to reduce lag, latency or dropped packets in the game, and a service provider may make the connection request in response to a request from a user to the service provider. Such an arrangement permits the service provider to verify payment or account details for the requesting user prior to the connection request being made to the controller. In yet other embodiments, the timing of the connection initiation may be based on the application account type such as whether the account is for an individual user, enterprise user, government user, and the connection may be set up immediately, or on-the-fly.

In embodiments where the user connection request is sent directly to the controller, the controller may receive the connection request and verify the user's credentials or billing in a single step. In such an embodiment, the controller, or an accounting subsystem, may verify or bill the user by checking the user's credentials through a third party database, or may charge or debit a user's account in a temporary account database for reconciliation with the third party service provider at a later time.

It should be noted that the controller may receive the connection request directly from the third party software, or may receive the connection request through one or more intermediary systems. For example, the controller may be deployed behind a gateway for security purposes, system sequestration, or the like.

While waiting for user requests, the system may monitor or track the optical network resource pool, as described above with respect to block 102 by receiving network topology reports in block 210 and receiving network status reports in block 212. The network topology reports may passively or actively acquired, or a combination of active and passive reports.

Actively acquired network topology reports may be solicited by the controller or another system module by requesting routing tables, or connection descriptions from ROADMs, wireline routers or switches, border devices, from other controllers, or the like. Passively acquired network topology reports may be acquired by listening to the routing updates of declarations made by devices on the network. In some embodiments, one or more devices may register as a router to cause the devices in the network to report the routing tables and updates to the controller or other modules responsible for gathering the network topology updates.

The resource pool may be generated or updated from the network topology reports to, for example, determine what legs are available in the optical network or in the wireline network, and what legs or connections connect the optical network to the wireline network.

Network status reports may also be acquired actively or passively, with the reports being received by passively listening for, or actively requesting, traffic reports, network device status reports or the like. The resource pool may be updated using the status reports by, for example, weighting the usability of different legs based on the network status reports. For example, for a router feeding a particular entry point into the optical network, a controller may receive reports that the router is down or close to its maximum capacity. Such reports may indicate that the ROADM or border device for that entry point into the optical network should not be used to route connections across the wireline-optical network border unless required. The network status reports may also include updates to the optical network resource pool describing on bandwidth used for different legs in the optical network, as described above.

After the connection request is received in block 206, the route for the connection is determined in block 208 based on information in the optical network resource pool. The route is determined in block 208 as discussed above, and may include determining a route through the optical network as well as routes through connecting wireline networks. In some embodiments, the controller determines the flow requirements for the connection, such as, for example, required bandwidth, quality of service, security or protection level, or the like. The route may be determined taking into account the flow requirements for the connection.

The route ROADMs are identified in block 214. The route ROADMs are the ROADMs that service the route identified for the connection request. In some embodiments, the determination of the route in block 208 may generate route data such as a route file, message, set of database entries, or the like, that identifies specific ROADMs, routers, legs, or the like. The route ROADMs may then be determined directly from the route data if the ROADMs are identified in the route data, or may be determined from, for example, route legs identified in the route data.

Modified or combined light paths are calculated in block 216. In some embodiments, light paths may be combined or modified so that multiple signals over separate light paths are multiplexed into a shared channel by, for example WDM. In some embodiments, the controller may analyze the legs of existing light paths to determine whether legs of existing light paths are on the same link as legs of the identified route for the requested connection, and if the legs are on the same link the legs may be multiplexed in a same channel of either leg has, or would have, excess bandwidth allocated in the carrier channel. Commands instructing the ROADMs to multiplex signals, create channels for light paths, and the like, are subsequently generated and sent to the ROADMs.

In block 222, the optical network resource pool is updated with the newly determined route information or route/light path optimization information, as described above. In block 218, path setup commands are sent to the ROADMs. Additionally, path setup commands, or routing commands, are sent to any routers in the wireline network, or to border devices between the optical network and the wireline network. The path setup commands may be sent from the controller through a command translator, as described above. In some embodiments, this may include requesting a route through the wireline network from a specific starting point or source to a specific border device of the optical network or to a connection point between the wireline and optical networks. Such on-the-fly routing in the wireline network may be used where a specific route in the wireline network is not defined prior to light path setup, as the routing in a wireline network is part of the internet protocol (IP) routing functionality. Thus, the routing functionality for wireline networks may be advantageously applied by first determining a route through the optical network, and then connecting the wireline portion of a route to the determined light path end points. Additionally, on-the-fly routing may be used in the optical portion of the network for light path setup. For example, a wireline device such as a router or switch may receive a packet of a connection from a user account or application that requests an optimized optical connection, and the controller may set up a light path for the connection on-the-fly. In such an example, the controller may command the wireline portion of the network cto connect the connection through the newly created light path so that the connection is able to use the optimized connection path without interruption or delay in connection setup.

It should be understood that, in pure optical networks such as fiber-to-the-home or fiber-to-the-neighborhood, or for servers or devices that have direct optical feeds, or directly connected optical connections, wireline routing may be eliminated at an end of the optical route since the wireline routing is not needed. Additionally, multiple wireline routes may be determined, for example, where a route runs through multiple wireline networks, multiple optical network connected by wireline networks, or the like. Such an example may be where a backbone or core network is an optical network, and the networks directly servicing an endpoint such as a user device or service provider device, may be wireline networks.

In block 220, the data is transmitted over the new route or light path that is determined in block 208. After the light path is set up, the controller may notify the devices on the connection, or the software controlling o requesting the connection, that the connection is ready for use, for example, by sending a connection acknowledgement or the like.

Figure 3A:
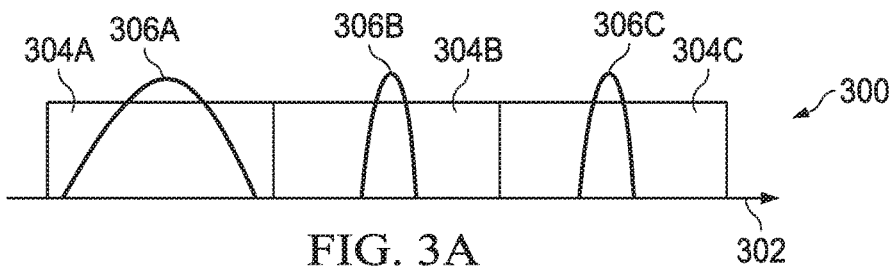
FIGS. 3A and 3B are diagrams illustrating various embodiments for multiple light signals in one or more channels.

FIG. 3A illustrates a light path channel arrangement 300 with multiple light signals 306A . . . 306C in multiple channels 304A . . . 304C, where axis 302 represents frequency. Different light signals 306A . . . 306C are each distributed in individual light paths, and the light signals 306A . . . 306C may be of various bandwidths and disposed within standard width channels 304A . . . 304C, resulting in unused and wasted optical network bandwidth. For example, some optical network standard specifications call for channels 304A . . . 304C that are spaced 50 GHz apart, and formed from 16 optical slots. Assuming a spectacle efficiency of 1 bit per Hertz, a light signal 306A . . . 306C that is less than 50 gigabits per second (Gbps) will require an optical bandwidth of less than 50 GHz, resulting in the excess optical bandwidth of a 50 GHz channel being wasted. For example, a first light signal 306A may be 40 Gbps, requiring 40 GHz of optical bandwidth. Other signals, such as second light signals 306B and 306C may be 10 Gbps signals, requiring 10 GHz of optical bandwidth. In such an example, the light signals 306A . . . 306C each use 10 to 40 GHz less than are allocated in the respective channel 304A . . . 304C.

Figure 3B:
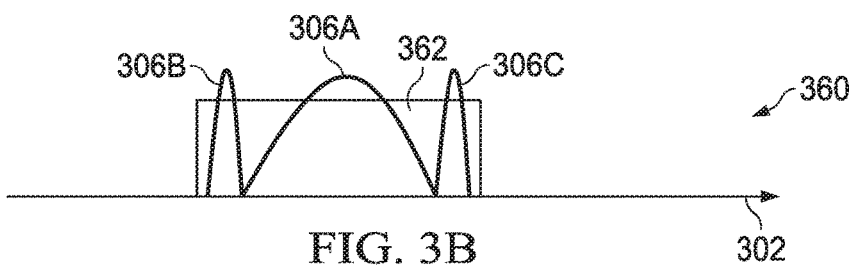

FIG. 3B illustrates a light path channel arrangement 360 multiple light signals 306A . . . 306C multiplexed into a shared channel 362 according to some embodiments, where axis 302 represents frequency. In some embodiments, a controller may instruct the ROADMs to perform WDM to consolidate multiple light signals 306A . . . 306C into a single shared channel 362. The shared channels 362 may be standard sizes, such as 50 GHz, or may be custom sizes, such as 75 GHz, or the like. For example, while a standard sized channel has a size of 50 GHz using 16 slots in the optical network bandwidth scheme, a custom sized shared channel 362 may be 75 GHz, using 24 slots in the optical bandwidth scheme.

In some embodiments, the controller may optimize the size of the shared channels 362 to ensure that slots or bandwidth assigned to channels are used efficiently. In such an embodiment, the controller may determine, based on the required bandwidth for each light signal 306A . . . 306C, that multiple light signals transmitting one or more legs on the optical network may be consolidated into a one or more shared channels 362, and determine the required size for the shared channels, as well as the light signals 306A . . . 306C that should be assigned to each path. In other embodiments, the shared channels may be assigned a size that is selected from a preselected list of available sizes, and the controller may determine which size to assign the shared channel based on the required bandwidth of the light signals 306A . . . 306C. Additionally, the controller may optimize the allocation of lights signals 306A . . . 306C to different shared channels 362.

The controller sends commands to the ROADMs to multiplex multiple tributary light signals 306A . . . 306C into the shared channels 362. In some embodiments, the commands from the controller are translated by the command translator, permitting the controller to issue nonstandard commands, which are translated into standard commands usable by the ROADMs. For example, the controller may issue a command to consolidate three light signals 306A . . . 306C into a shared channel of nonstandard width. In such an example, the command translator may take the command such a command and break it down into a first command to create a nonstandard sized shared channel 362, and subsequent commands to multiplex each signal into the shared channel 362.

Figure 4:
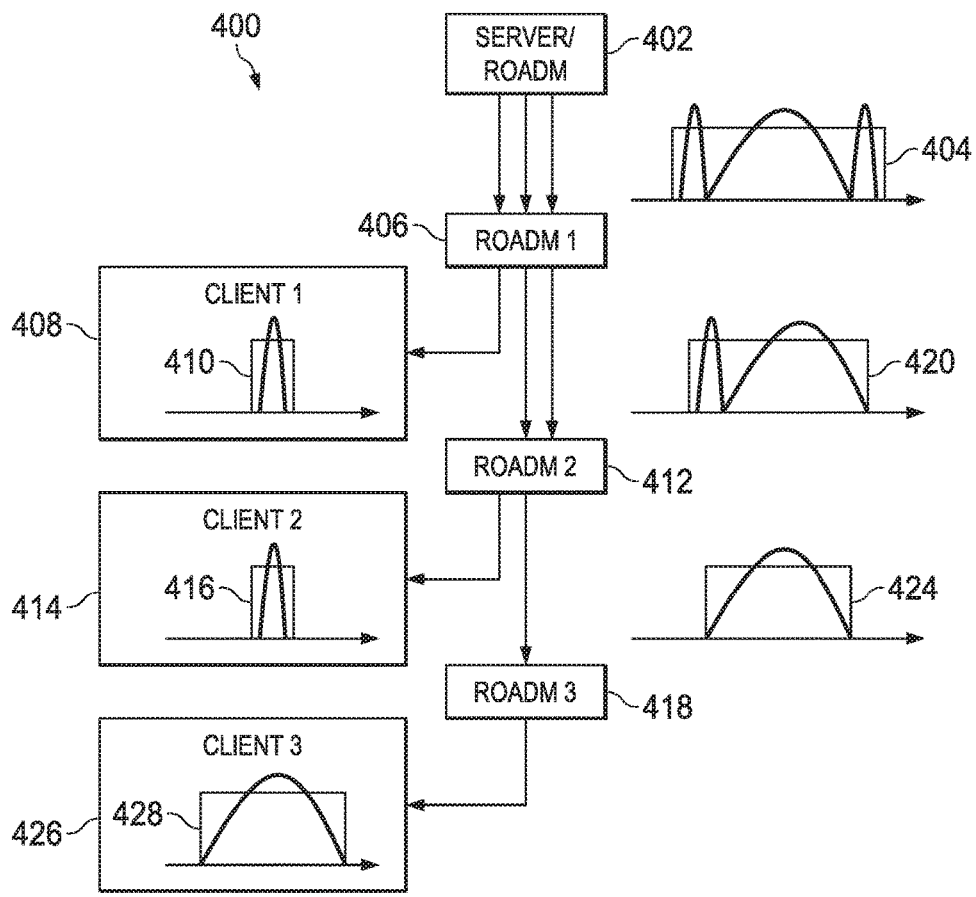
FIG. 4 is a diagram illustrating a system for accessing multiplexed optical signals according to some embodiments.

FIG. 4 is a diagram illustrating a system 400 for accessing multiplexed light signals 404 according to some embodiments. The multiplexed light signal 404 is sent from a source 402 such as a server, ROADM or another device on an optical network. The multiplexed light signal 404 has two or more individual light signals 410, 416, 428 in a shared channel, as described above. A first ROADM 406 receives the multiplexed light signal 404 and separates out a first light signal 410, for transmission to a first client 408. After separating the first light signal 410 from the multiplexed light signal 404, a second multiplexed light signal 420 is transmitted to a second ROADM 412. In some embodiments, the first ROADM 406 may modify the shared channel carrying the first multiplexed light signal 404 to free slots used by the separated, first light signal 410 or adjust or modify the frequencies on which the light signals are carried in the shared channel. In other embodiments, the first ROADM 406 may modify the incoming multiplexed light signal 404, or may deconstruct the incoming multiplexed light signal 404 by separating out all of the light signals and then form a new multiplexed light signal 420 that uses, for example, a different shared channel. Additionally, the first ROADM 406 may add additional light signals into the multiplexed light signal 420.

The second ROADM 412 receives the second multiplexed light signal 420 and separates out a second light signal 416, which is transmitted to a second client 414. A third light signal 424 is transmitted to a third ROADM 418, which separates out a third light signal 428, which is transmitted to a third client 426. While the presented embodiment illustrates three ROADMs separating out three light signals 410, 416, 428, the system is not limited to such an arrangement, as any number of ROADMs may be employed, and any number of light signals may be removed or added by any of the ROADMs into one or more multiplexed light signals.

Additionally, it should be understood that, while the aforementioned embodiment illustrates individual light signals 410, 416, 428 being sent directly to individual clients 408, 414, 426, the embodiments are not limited to such an arrangement. For example, the ROADMs 406, 412, 418 may separate out the individual light signals 410, 416, 428 and create a wireline signal from each light signal 410, 416, 428, or may send the light signals 410, 416, 428 to an intermediate device for conversion or mediation into a wireline signal that is then transmitted to the individual clients 408, 414, 426.

Figure 5:
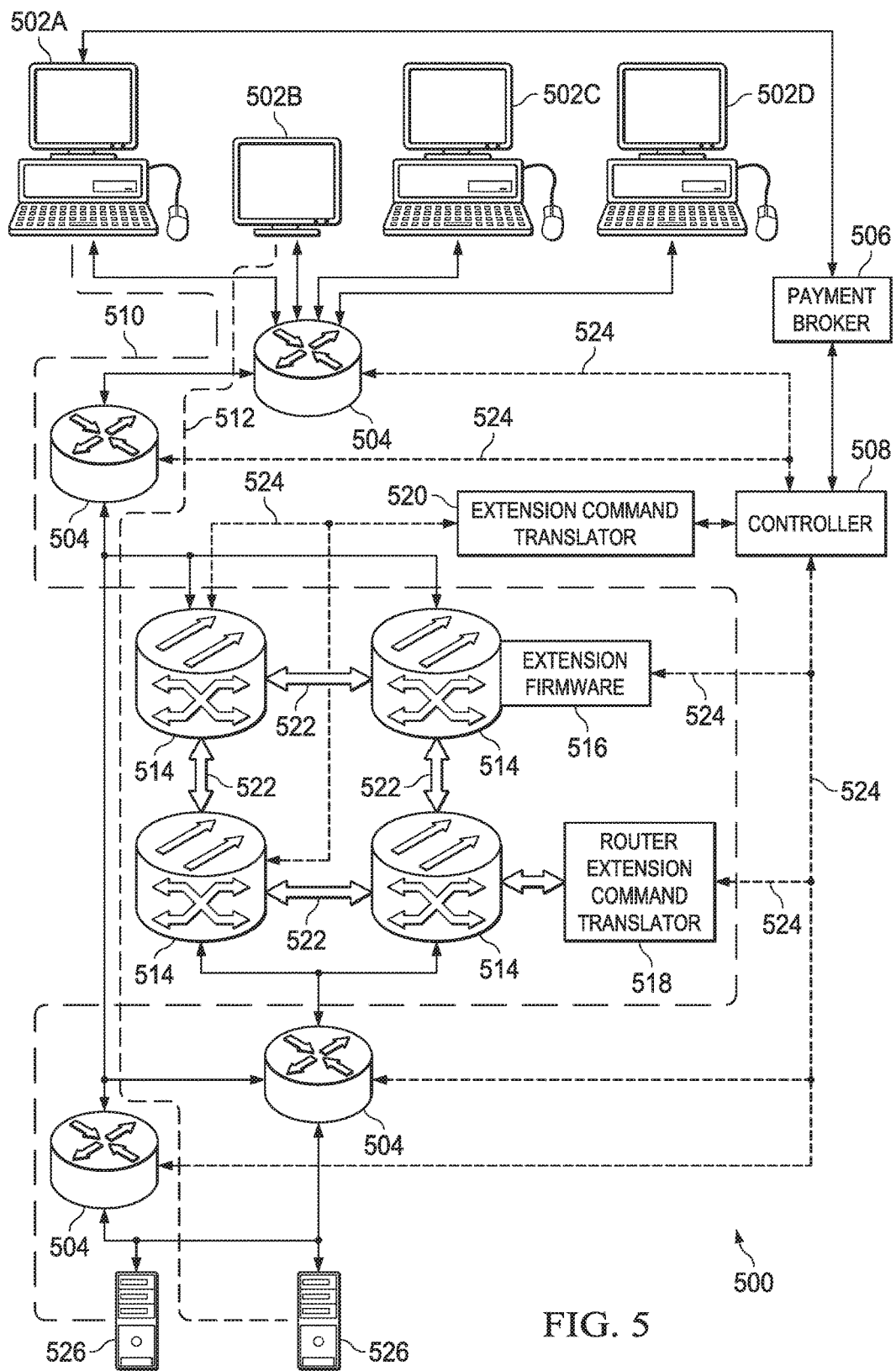
FIG. 5 is a system diagram illustrating an optical network according to some embodiments.

FIG. 5 is a system diagram illustrating a system 500 with an optical network portion according to some embodiments. User devices 502A . . . 502D are connected to servers 526 through wireline routers 504 and an optical network comprising one or more ROADMs 514. The optical portion of the network comprises optical connections 522 between the ROADMs 514. In some embodiments, the wireline routers 504 provide connection between the ROADMs 514 and the user devices 502A . . . 502D, and between the servers 526 and the ROADMs 514. Thus, a first route 510 between the user devices 502A . . . 502D and the servers 526 may at least partially traverse the optical portion of the network. It should be understood that the illustrated arrangement is not limiting, as the optical portion of the network may connect directly to the user devices 502A . . . 502D, the servers 526, or to both, or may be connected to the user devices 502A . . . 502D and/or servers 526 by separate or specialized sub-networks, or the like. The wireline routers 504 may also provide a purely wireline route 512 between user devices 502A . . . 502D and between the servers 526, bypassing the optical portion of the network. Thus, the use of the optical network may be considered a premium or high-bandwidth, low latency network segment.

In an embodiment, the controller 508 is connected to the routers 504 and to the ROADMs 514 through command channels 524 so that the controller 508 can communicate with those devices to issue commands, or receive, for example, network status or topology reports. In some embodiments, the controller 508 communicates with the ROADMs 514 to set up, modify, or tear down light paths on the optical connections 522 between the ROADMs 514. In some embodiments, the command channels 524 are dedicated physical lines separate from the wireline connections or optical connections 522, and in other embodiments, the command channels 524 use the wireline connections or other existing network physical lines. In yet other embodiments, the command channels 524 use a combination of dedicated physical lines and network lines, for example, with the ROADMs 514 being connected to the controller 508 at least partly by dedicated physical lines, and the routers 504 communicating over wireline connections.

In some embodiments, the command channels 524 on the wireline connections may use sideband Ethernet communications or the like to avoid using available network bandwidth. Additionally, in some embodiments, the dedicated physical lines between the controller 508 and the ROADMs 514 are, for example, I2C buses, RS232 interfaces, or the like.

In some embodiments, the controller 508 may implement a standardized router control system with extensions for controlling the ROADMs 514. For example, OpenFlow is a communications protocol that gives access over the network to the forwarding plane of a network switch or router. In such an example, the controller 508 may use a modified version of OpenFlow, adding extensions, or additional commands, for managing the ROADMs. Thus, the data paths reside on the routers 504 and ROADMs 514, while high-level routing decisions are moved to a separate controller 508, which, in some embodiments, is deployed on one or more servers. In such an embodiment, the controller 508 communicates with the routers 504 and ROADMs 514 via the OpenFlow protocol over the command channels 524. The standard OpenFlow protocol may define messages, such as packet-received, send-packet-out, modify-forwarding-table, and get-stats, or the like, and the OpenFlow extensions may define commands or messages such as, for example, set_frequency, set_Code, or the like, for controlling the ROADMs 514, for setting up routes through the system, or the like.

Command translators 516, 518, 520 are disposed between the controller 508 and the ROADMs 514 to translate the controller extensions into a previously defined set of commands such as, for example, TL1 surveillance and maintenance messages used by existing optical network equipment such as ROADMs or logical link controller (LLC) ethernet messages, ethernet datagram protocol message, or the like. Thus, off-the-shelf, existing or previously deployed ROADMs 514 may communicate with a controller 508 without modification to the ROADM itself. In some embodiments, the controller 508 may have an extension command translator 502 integrated therein, or installed at the controller 508 to provide an abstraction layer for command translation from, for example, OpenFlow extensions or commands, into ROADM specific commands. Additionally, a router or ROADM extension command translator 518 may be installed on a router to translate commands from the controller into commands that are executed by stock firmware on a ROADM 514. For example, the stock firmware on the ROADM 514 may be configured to execute purely optical networking. Updated ROADMs may have extension firmware 516, or firmware that is configured to understand or execute the controller commands, such that the extension firmware 516 acts as a command translator without requiring additional modules or software.

Thus, a first user device 502A may submit a request for a premium connection to the controller 508 through, for example, a payment broker 506, a third party service provider, an internet service provider, or the like. The controller 508 may provide connection points or data submission points for public or limited access. For example, the controller may provide an API, simple object access protocol (SOAP) interface, extensible markup language (XML) interface, or other interface for receiving connection requests. In some embodiments, such an interface may be public, or open to any connection request, with the connection request including authentication credentials or the like for verifying the authenticity of the request or the party making the request. In other embodiments, the interface may be private, with security or authentication required prior to making the request.

The request itself may identify a user account, a user address such as an IP address, a user equipment identifier, such as a software identifier (SID) or media access control (MAC) address, a destination address such as an IP address, a requested service identifier, or the like. After receiving the request, the controller 508 may identify the endpoints for which a route is required. For example, a user requesting a premium connection while gaming may request a premium connection for a particular game, gateway, service or server by identifying the IP address of the destination server or gateway, or a game or service name which may be cross referenced to a corresponding IP address. The route starting point may be the game console, device, smartphone, computer or the like of a user, or the router, gateway, switch or server servicing the user device 502A. In another example, a user requesting a connection for a video conference, telemedicine session, streaming communication or the like may be provided with a conference hub identifier. Users connecting to the conference hub or server may be identified at the time of connection so that a premium connection may be set up for each user without requiring that each user identify their location or teleconference device prior to the connection being initiated. After receiving the request, the controller 508 identifies the endpoints for the requested connection and determines a route between the end points by checking the requested quality of service for the connection, the topography of the network, the available bandwidth on each leg of at least the optical network, and other factors such as scheduled connections, congestion points, border device capacity, or the like. The controller 508 may then identify the ROADMs 514 for the route, determine whether existing or scheduled connections on the optical network may be optimized, and then generate and sends commands to the ROADMs 514 and routers 504 to create the route and modify optical path allocations for the route or other existing connections or routes. As discussed above, the commands to the ROADMs 514 may be extensions of standard router control protocols, and the commands translators 516, 518, 520 may translate the commands into a different format or protocol for the ROADMs 514. The ROADMs 514 and routers 504 then implement the commands and provide the first route 510 through the optical network.

Figure 6:
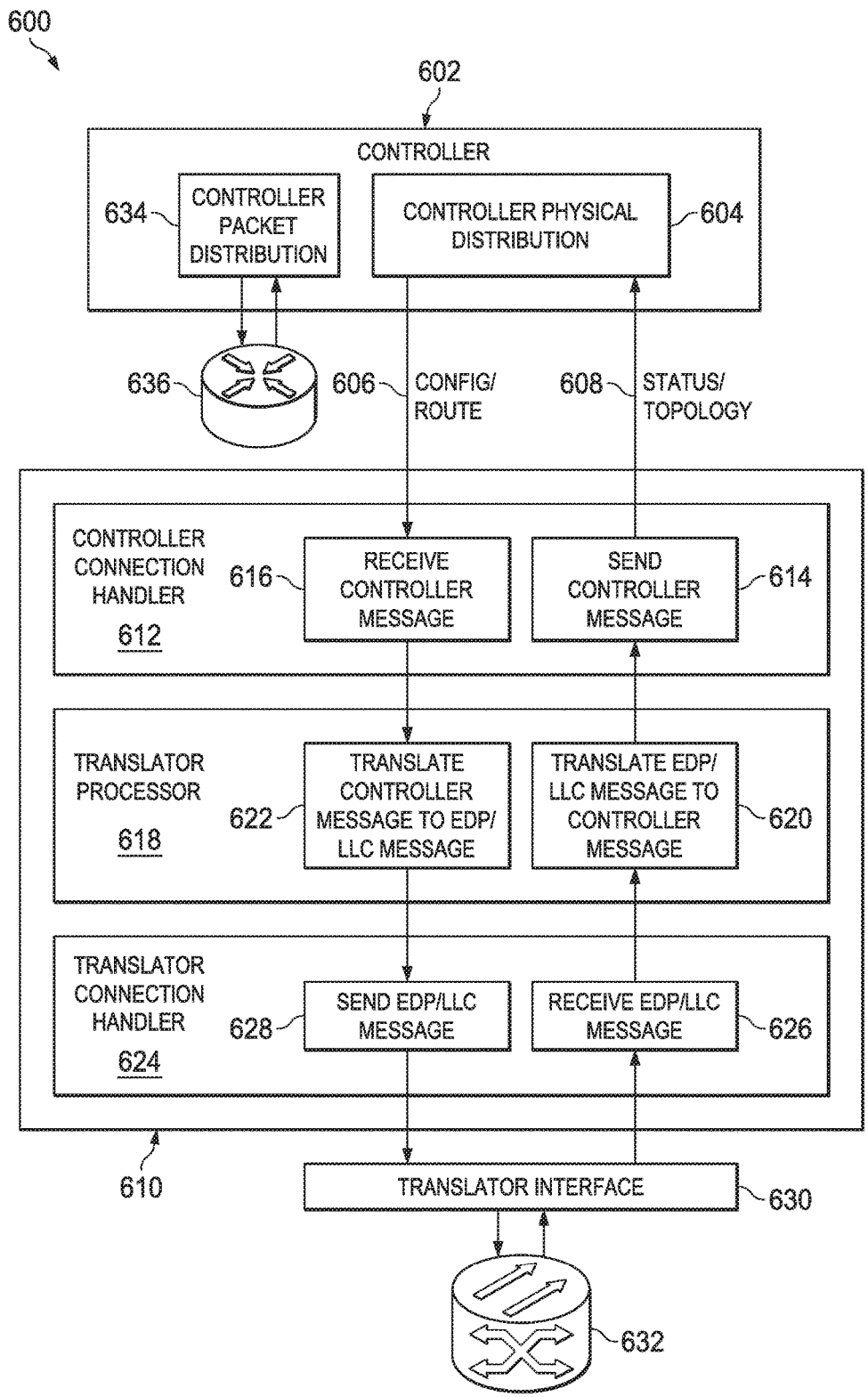
FIG. 6 is a logical diagram illustrating operation of a controller according to some embodiments.

FIG. 6 is a logical diagram illustrating operation of system 600 having a controller 602 and command translator 610 according to some embodiments. A controller 602 has a controller physical distribution module 604 and, in some embodiments, a controller packet distribution module 634. The physical distribution module 604 handles the physical layerconnections of an optical portion of a network, while the controller packet distribution module 634 handles the packet layer connections of a wireline or packet-level portion of the network. In some embodiments, the controller 602 may coordinate operation of the packet layer of the network with the optical portion of the network to create a route through the network that includes wireline and optical links.

In some embodiments, the physical distribution module 604, for example, sends configuration and routing commands 606 and receives status and topology reports 608. The controller 602 sends the command translator 610, for example, messages carrying command extensions such as OpenFlow extensions. A controller connection handler 612 in the command translator 610 handles communications with the controller 602 to receive controller messages, in block 616, from, and, in block 614, send messages to, the controller physical distribution module 604. The controller connection handler 612, in some embodiments, handles queueing of messages, manages connection states, maintains connections between the command translator 610 and the controller 602, and the like so that the controller 602 can maintain or manage connections for communications sessions that require multiple messages, responses or reports that are sent in response to messages, or the like. For example, a controller 602 may request a status or topology report from a ROADM or router, and may maintain the connection while waiting for the response.

The command translator 610 has a translator processor module 618 that translates messages between the extension format employed by the controller 602 and the message format used by the ROADMs 632. In block 622, the translator processor module 618 translates controller messages into, for example, EDP or LLC formatted messages, and in block 620, translates incoming message into the controller extension format.

The command translator 610 has a translator connection handler module 624 that communicates with the ROADMs 632 through a translator interface 630. The translator connection handler 624 handles queueing of messages, maintaining connections between the translator and the ROADMs 632, and the like. In block 628, the translator connection handler 624 sends the translated messages in the ROADM message format, such as EDP or LLC formatted messages, from the translator processor module 618 to the ROADMs 632, using for example, an SDN protocol. In block 626, the translator connection handler 624 receives the ROADM formatted message from the ROADMs 632. In some embodiments, the messages are sent through a translator interface 630 such as a networking card or the like.

The controller packet distribution module 634 is in communication packet-level devices in the wireline portion of the network, which may include one or more wireline routers 636. The controller packet distribution module may control the packet-level devices by way of messages or commands, and set up links within the wireline portion of the network to create the wireline portion of a path for the requested connection. Thus, the controller may set up a connection according to a determined route by sending first commands to one or more ROADMs in the optical network portion and by sending second commands to one or more packet-level devices in the wireline network portion.

Figure 7:
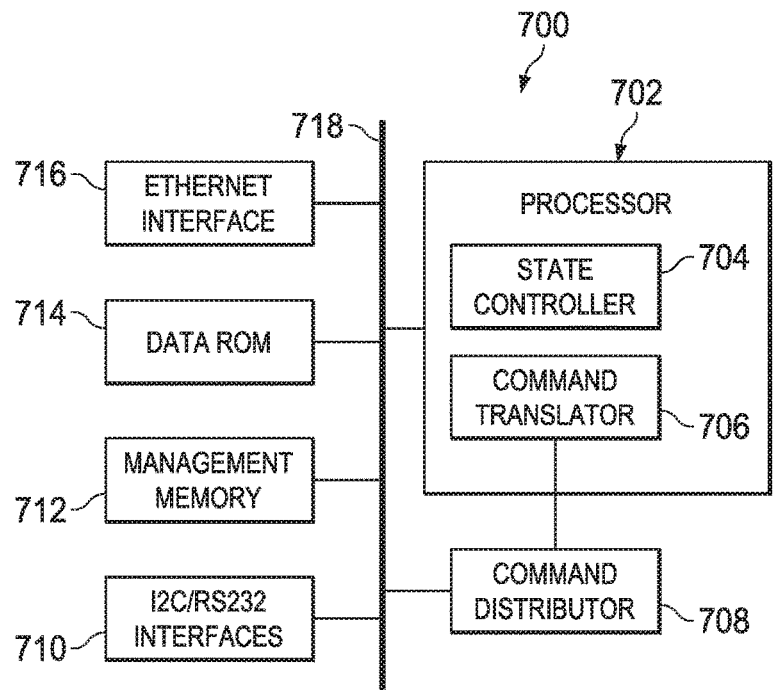
FIG. 7 is a system diagram illustrating a controller system according to some embodiments.

FIG. 7 is a system diagram illustrating a controller system 700 according to some embodiments. A hardware controller system 700 for providing a controller may comprise one or more processors 702 communicating over a system bus 718 to a networking interface such as an Ethernet interface 716, and a peripheral bus such as an I2C or RS232 interfaces 710. The processor 702 is also in communication with data ROM 714 memory, for example, to load executable instructions, that when executed, cause the processor 702 to perform the processes, methods or steps described herein. The data ROM 714 may be any non-transitory computer readable medium for permanent, rewriteable, or non-volatile storage of instructions. Additionally, management memory 712 may be accessed by the processor 702 through the bus 718 so the processor 702 stores working data or instructions during operation. The processor 702 may run software systems such as the command translator 706 and a state controller for managing the operation and control of the optical network. In some embodiments, the processor runs software components or executable programs implementing a state controller 704 and the command translator 706. In other embodiments, the command translator may be disposed on a computer or system separate from the state controller 704. The command translator 706 translates commands from the controller into device-specific formats, and the command distributor 708 handles sending the messages on the specific bus or interface to the target devices. The state controller 704 may be a component that tracks the optical network resource pool, connection scheduling, billing, network status, or the like.

The command distributor 708 communicates over the peripheral buses with optical amplifiers such as erbium-doped fiber amplifiers (EDFAs), tunable transceivers, wavelength selective switches (WSSs), or other devices that are not necessarily Ethernet-enabled. Thus, the command translator may handle generating the specific commands issued over the peripheral buses, translating controller formatted based messages into peripheral bus-based messages. Similarly, Ethernet enabled devices such as routers, ROADMs or the like may be connected to the Ethernet interface for communication of messages or commands from the command distributor 708.

Figure 8:
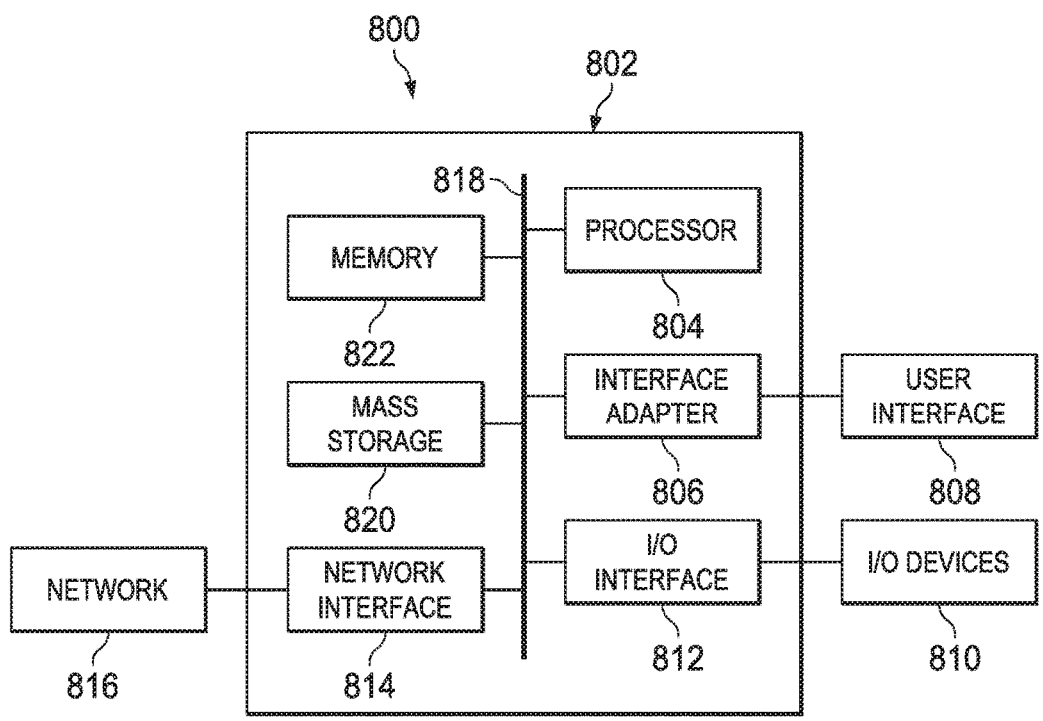
FIG. 8 is a system diagram illustrating a hardware system for implementing the embodiment methods.

FIG. 8 is a system diagram illustrating a hardware system 800 for implementing the embodiment methods. Specific devices may utilize all of the components shown, or only a subset of the components, and levels of integration may vary from device to device. Furthermore, a device may contain multiple instances of a component, such as multiple processing units 802, processors 804, memories 822, transmitters, receivers, etc. The hardware system 800 may comprise a processing unit 802 equipped with one or more input/output devices 810, such as a speaker, microphone, touchscreen, keypad, mouse/keyboard/printer, user interface 808 such as a display, and the like. The processing unit 802 may include a central processing unit (CPU) such as a processor 804, memory 822, a mass storage device 820, an interface adapter 806, and an I/O interface 812 connected to a bus 818.

The bus 818 may be one or more of any type of several bus architectures including a memory bus or memory controller, a peripheral bus, video bus, or the like. The processor 804 may comprise any type of electronic data processor, and may be multiple processors. The memory 822 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 822 may include ROM for use at boot-up, and DRAM for program and data storage for use while executing programs.

The mass storage device 820 may comprise any type of non-transitory storage device configured to store data, programs, and other information and to make the data, programs, and other information accessible via the bus. In some embodiments, the mass storage device may have stored thereon instructions for causing the processor 804 to perform the method steps described above. The mass storage device 820 may comprise, for example, one or more of a solid state drive, hard disk drive, a magnetic disk drive, an optical disk drive, or the like.

The interface adapter 806 and the I/O interface 812 provide interfaces to couple external input and output devices to the processing unit 802. As illustrated, examples of input and output devices include the display or user interface 808 coupled to the interface adapter 806 and the I/O devices 810, such a mouse/keyboard/printer, coupled to the I/O interface 812. Other devices may be coupled to the processing unit 802, and additional or fewer interface cards may be utilized. For example, a serial interface such as Universal Serial Bus (USB) (not shown) may be used to provide an interface for a printer.

The processing unit 802 also includes one or more network interfaces 814, which may comprise networking adapters, wired links, such as an Ethernet cable or the like, and/or wireless links to access nodes or different networks. The network interface 814 allows the processing unit 802 to communicate with remote devices via the networks 816. For example, the network interface 814 may provide wireless communication via one or more transmitters/transmit antennas and one or more receivers/receive antennas, or by one or more antennas and a transceiver. In an embodiment, the processing unit 802 is coupled to a local-area network or a wide-area network for data processing and communications with remote devices, such as other processing units, the Internet, routers, ROADMs, other networking devices, remote storage facilities, or the like. In other embodiments, the processing system is a networking device, controller system host, or the like and the network interface is a network card or optical interface that permits the processing unit 802 to communicate with the network.

In view of the foregoing, an embodiment method includes receiving a request for a first connection at a controller in signal communication with one or more first reconfigurable optical add-drop multiplexers (ROADMs) controlling an optical network portion of a communications network, wherein the controller is connected to the communications network. The controller determines a route on the communications network for the first connection according to conditions of the communications network, with the route including one or more first links of the optical network. The controller determines one or more first ROADMs controlling the one or more first links and sends commands from the controller to the one or more first ROADMs to allocate bandwidth on the one or more first links.

In some embodiments, the method further includes optimizing, by the controller, allocation of bandwidth for the first connection and one or more second connections in at least one of the first links. In some embodiments, optimizing the allocation of bandwidth includes optimizing allocation of one or more channels to which the first connection and the one or more second connections are assigned. In some embodiments, optimizing the allocation of the one or more channels includes determining an unused optical bandwidth of a first channel carrying the one or more second connections passing through the one or more first links and determining an arrangement for a second channel with a modified optical bandwidth allocation for the first connection and the one or more of the second connections. In such embodiments, commands are sent to the one or more first ROADMs to create the second channel and to transmit the first connection and the one or more second connections in the second channel.

In some embodiments, the request for the first connection is received at the controller from a third party other than a user initiating the request, and in some embodiments, the request for the first connection is received through an application programming interface (API) of the controller.

In some embodiments, sending the commands includes transmitting first commands from the controller in a first command format to a command interpreter, generating, from the first commands and by the command interpreter, second commands in a second command format, and transmitting the second commands from the command interpreter to the one or more first ROADMs.

In some embodiments, the controller may also send third commands to the one or more packet-level devices on a wireline portion of the network to set up the route such that the route further includes one or more second links in the wireline portion of the network.

Another embodiment method includes monitoring, by a controller, network conditions on a communications network having an optical network portion controlled by reconfigurable optical add-drop multiplexers (ROADMs) in signal communication with the controller. A request for a first connection is received and a route for the first connection is determined according to network conditions, with the route including one or more links of the optical network. First commands are then transmitted from the controller to the ROADMs to set up the route.

In some embodiments, the method also includes the controller optimizing allocation of bandwidth for the first connection and one or more second connections in at least part of the route by combining the first connection and the one or more second connections into a same optical transmission channel.

In some embodiments, the request for the first connection is received through an application programming interface (API) of the controller from a third party other than a user initiating the request.

In some embodiments, the communications network includes one or more wireline links and the route further includes the one or more wireline links.

In some embodiments, monitoring the network conditions includes receiving at least one of network topology or network status reports.

In some embodiments, transmitting the first commands includes translating the first commands into second commands by a command translator and transmitting the second commands from the command translator to the ROADMs. The ROADMs then set up the route according the second commands. The first commands are in a first format and the second commands are in a second format different from the first format.

An embodiment network flow controller, includes one or more communications interfaces, a processor connected to the one or more communications interfaces and a non-transitory computer readable medium connected to the processor and having stored thereon instructions. When executed, the instructions cause the processor to receive, through the one or more communications interfaces, at least one of network condition reports or network topology reports from reconfigurable optical add-drop multiplexers (ROADMs) in a communications network having an optical network portion. The instructions further cause the processor to receive a request for a first connection and determine a route for the first connection according to network conditions, with the route comprising one or more links of the optical network portion. The instructions further cause the processor to determine one or more first ROADMs controlling the one or more links and transmit first commands to the ROADMs to set up the route.

In an embodiment, the instructions causing the processor to determine the route include instructions, that when executed, cause the processor to optimize allocation of one or more channels in at least one of the links to which the first connection and one or more second connections are assigned.

In an embodiment, the instructions causing the processor to optimize the allocation of the one or more channels include instructions, that when executed, cause the processor to determine unused optical bandwidth of a first channel carrying the one or more second connections passing through the one or more links, and determine an arrangement for a second channel with a modified optical bandwidth allocation for the first connection and the one or more of the second connections.

In an embodiment, the non-transitory computer readable medium further has stored thereon instructions that, when executed, cause the processor to maintain an optical network resource pool representing resources in the optical network that are available for assignment to connections. In such an embodiment, the instructions causing the processor to receive at least one of the network condition reports or the network topology reports include instructions, that when executed, cause the processor to update the optical network resource pool in accordance with the received at least one of network condition reports or the network topology reports.

In an embodiment, the non-transitory computer readable medium further has stored thereon instructions that, when executed, cause the processor to provide an application programming interface (API), and receive the request through the API from a third party other than a user initiating the request.

In an embodiment, the instructions causing the processor to transmit the first commands include instructions, that when executed, cause the processor to translate the first commands into second commands in a second command format different from a first command format of the first command format, and transmit the second commands to the one or more first ROADMs. In an embodiment, the instructions causing the processor to transmit the first commands include instructions, that when executed, cause the processor to transmit the first commands to a first command interpreter for translation of the first commands into second commands. In such an embodiment, the first commands are in a first command format and the second commands are in a second command format different from the first command format.

An embodiment network flow controller includes a processor connected to the one or more communications interfaces and a non-transitory computer readable medium connected to the processor and having stored thereon instructions. The instructions, when executed, cause the processor to receive a request for a first connection on a network having at least an optical network portion and a wireline network portion, and determine a route for the first connection according to network conditions, with the route comprising one or more first links of the optical network portion and one or more second links of the wireline network portion. The instructions further cause the processor to set up the first connection according to the route by sending first commands to one or more reconfigurable optical add-drop multiplexers (ROADMs) in the optical network portion and by sending second commands to one or more packet-level devices in the wireline network portion.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method performed by a controller in signal communication with a reconfigurable optical add-drop multiplexer (ROADM) controlling a first link in an optical network portion of a communications network, the method comprising:
   receiving, by the controller, a first request for a first connection, the first link being in a first route in the communications network for the first connection;
   sending, by the controller, first commands to the ROADM to allocate first bandwidth to the first link for at least the first connection;
   receiving, by the controller, a second request for a second connection, the first link being in a second route in the communications network for the second connection; and
   sending, by the controller, second commands to the ROADM to allocate second bandwidth to the first link for at least the first and second connections.

2. The method of claim 1, further comprising:
   optimizing, by the controller, bandwidth allocation for the first connection and the second connection in at least the first link.

3. The method of claim 1, wherein the first request for the first connection is received at the controller from a third party other than a user initiating the first request.

4. The method of claim 1, wherein the sending the first commands comprises:
   transmitting third commands from the controller in a first command format to a command interpreter;
   generating, from the third commands and by the command interpreter, fourth commands in a second command format; and
   transmitting the fourth commands from the command interpreter to the ROADM.

5. The method of claim 1, further comprising:
   sending other commands from the controller to one or more packet-level devices on a wireline portion of the communications network to set up the first route such that the first route further comprises a second link in the wireline portion of the communications network.

6. The method of claim 2, wherein the optimizing the bandwidth allocation comprises optimizing allocation of one or more channels to which the first connection and the second connection are assigned.

7. The method of claim 3, wherein the first request for the first connection is received through an application programming interface (API) of the controller.

8. The method of claim 6, wherein the optimizing the allocation of the one or more channels comprises:
   determining an unused optical bandwidth of a first channel carrying the second connection passing through the first link;
   determining an arrangement for a second channel with a modified optical bandwidth allocation for the first connection and the second connection; and
   sending the second commands to the ROADM to create the second channel and to transmit the first connection and the second connection in the second channel.

9. A network flow controller, comprising:
   a non-transitory memory storage comprising instructions; and
   one or more processors in communication with the memory storage, wherein the one or more processors execute the instructions to:
   receive a first request for a first connection, wherein a first link is in a first route in a communications network for the first connection;
   send, to a reconfigurable optical add-drop multiplexer (ROADM) controlling the first link in an optical network portion of the communications network, first commands to allocate first bandwidth to the first link for at least the first connection;
   receive a second request for a second connection, wherein the first link is in a second route in the communications network for the second connection; and
   send, to the ROADM, second commands to allocate second bandwidth to the first link for at least the first and second connections.

10. The network flow controller of claim 9, wherein the one or more processors execute the instructions to:
    optimize bandwidth allocation for the first connection and the second connection in at least the first link.

11. The network flow controller of claim 9, wherein the first request for the first connection is received at the controller from a third party other than a user initiating the first request.

12. The network flow controller of claim 9, wherein the one or more processors executing the instructions to send the first commands comprises the one or more processors executing the instructions to:
    transmit third commands from the controller in a first command format to a command interpreter;
    generate, from the third commands and by the command interpreter, fourth commands in a second command format; and
    transmit the fourth commands from the command interpreter to the ROADM.

13. The network flow controller of claim 9, wherein the one or more processors execute the instructions to:
    send other commands from the controller to one or more packet-level devices on a wireline portion of the communications network to set up the first route such that the first route further comprises a second link in the wireline portion of the communications network.

14. The network flow controller of claim 10, wherein the one or more processors executing the instructions to optimize the bandwidth allocation comprises the one or more processors executing the instructions to optimize allocation of one or more channels to which the first connection and the second connection are assigned.

15. The network flow controller of claim 11, wherein the first request for the first connection is received through an application programming interface (API) of the controller.

16. The network flow controller of claim 14, wherein the one or more processors executing the instructions to optimize the allocation of the one or more channels comprises the one or more processors executing the instructions to:
    determine an unused optical bandwidth of a first channel carrying the second connection passing through the first link;

determine an arrangement for a second channel with a modified optical bandwidth allocation for the first connection and the second connection; and send the second commands to the ROADM to create the second channel and to transmit the first connection and the second connection in the second channel.

\* \* \* \* \*

UNITED STATES PATENT AND TRADEMARK OFFICE
CERTIFICATE OF CORRECTION

PATENT NO. : 10,219,052 B2  
APPLICATION NO. : 15/692914  
DATED : February 26, 2019  
INVENTOR(S) : Jiafeng Zhu Page 1 of 1

It is certified that error appears in the above-identified patent and that said Letters Patent is hereby corrected as shown below:

On the Title Page

Item (72) Inventors, Line 4, delete "Tuscon" and insert --Tucson--.

Signed and Sealed this  
Thirtieth Day of April, 2019

Andrei Iancu  
*Director of the United States Patent and Trademark Office*